Sept. 8, 1936.  J. PEKROL  2,053,777
CORING DEVICE
Filed March 30, 1936
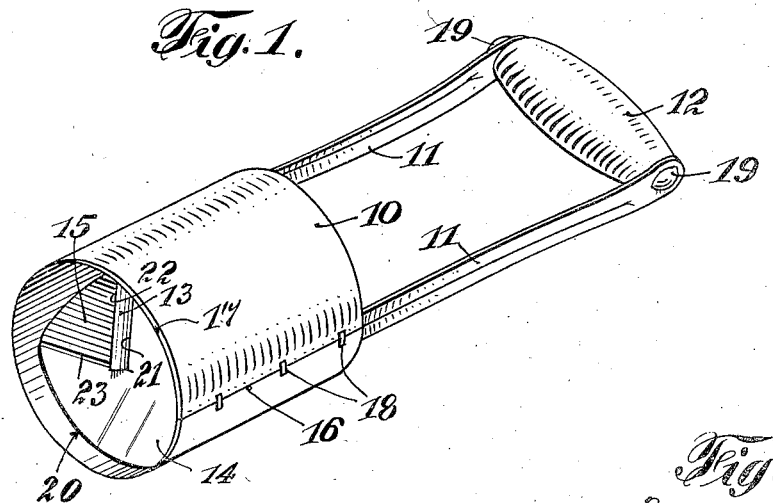
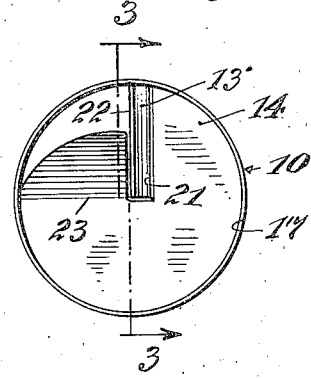
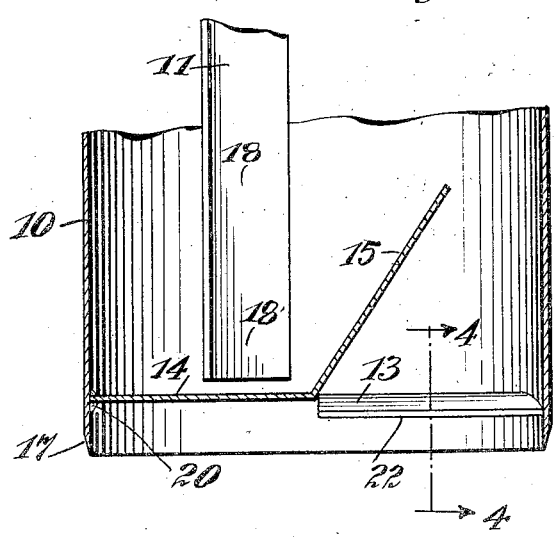
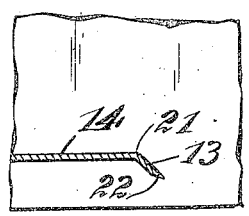
INVENTOR.
John Pekrol
BY
ATTORNEY.

Patented Sept. 8, 1936

2,053,777

UNITED STATES PATENT OFFICE 2,053,777

CORING DEVICE

John Pekrol, Newark, N. J.

Application March 30, 1936, Serial No. 71,548

5 Claims. (Cl. 146—53)

My invention relates to coring devices and refers particularly to relatively simple and inexpensive forms of hand-operated devices adapted for removing the fibrous, and in some cases seed-containing, core from various kinds of fruits and vegetables.

One object of my invention is a higher degree of efficiency than heretofore attained in this general type of device.

Another object of my invention is a coring device by which, when so desired, a bottom of any desired thickness may be left uncut in the well formed by the removed core.

Another object of my invention is a coring device by which the lower end of the core material can be easily cut free from the underlying rind, leaving the latter intact, to form a bottom closure after removal of the core.

Another object of my invention is a coring device which may be simply bored into the fruit or vegetable by means of rotative movement of the device combined with inward, or downward, pressure upon the device at the same time.

Another object of my invention is a coring device which will cut the core material free in the form of a helically spiral shaving.

Another object of my invention is a coring device which will first cut a portion of the core material free circumferentially and will then cut such material transversely, with both of these operations taking place progressively and simultaneously.

Another object of my invention is a coring device which will securely retain cut core material therein and from which it may be readily emptied out.

The above mentioned and other novel and useful attributes of the device of my invention will be evident upon a consideration of my specification and its accompanying drawing.

In the accompanying drawing illustrating one form of my invention, similar parts are designated by similar numerals.

Figure 1 is a perspective view of a coring device of my invention.

Figure 2 is a plan view of the lower end of the device.

Figure 3 is an enlarged broken vertical section on the line 3—3 of Figure 2.

Figure 4 is a broken vertical section on the line 4—4 of Figure 3.

The particular form of my invention shown in the accompanying drawing has a tubular cylindrical body member 10, a pair of similar handle arms 11—11, a finger grip 12, a knife blade 13, a platform 14 and deflecting wing 15.

The body 10 may be of relatively thin but sufficiently strong sheet steel, being shown as having an abutted joint at 16. It has a beveled lower cutting edge portion 17.

Each handle member bar 11 is indicated as being fixedly secured within and to the body shell 10 by means of a suitable number of spot welds 18—18, a line of which also unites the seam or joint 16.

The handle grip 12 is secured at 19—19 between the outer ends of the outwardly extended handle arms 11—11, which, as indicated, may be formed from metal strips or bars.

The knife 13, platform 14 and deflector 15 are shown as formed from a single circular plate or disc, desirably composed of sheet steel of suitable thickness.

The platform portion 14 of this disc is shown as flat and as disposed transversely in a horizontal position within the cylindrical body 10, with its circularly curved edge firmly secured thereto, such as by means of solder 20.

The knife blade 13 is struck downwardly at a desired suitable obtuse angle from the platform 14 along a line 21 which is parallel with its beveled cutting edge portion 22, the latter being substantially radial and extending from the periphery of the disc inwardly at least as far as its center, as shown.

The wing 15 is struck upwardly at a desired suitable obtuse angle from the platform 14 along a substantially full radial line 23 which is at right angles to the knife edge 22, this wing thus being substantially in the form of a quadrant-shaped sector.

The platform 14 is spaced inwardly or upwardly from the lower end of the body 10 to a sufficient extent so that the cutting edge 22 of the knife 13 will be spaced as shown to a suitable desired distance inwardly or upwardly from the circular cutting edge 17 of the cylindrical body 10.

The device of my invention of course may be made in different sizes in order thereby to adapt it for removing cores of a correspondingly different size.

The operation of the above described coring device of my invention is as follows:

It is well adapted for removing cores from different kinds of fruits and vegetables. Among these may be mentioned grape fruits, oranges, pineapples, apples, pears, tomatoes, et cetera.

With the cutting edge 17 centered over the core, the device is pressed downward and at the same time rotated in a clockwise direction. The relative amounts of pressure and rotation are readily determined.

The combined rotative and downward movement of the circular cutting edge 17 causes it to cut easily around the core. At the same time the same movements are causing the knife edge 22 to cut a spiral strip or shaving away from the upper end of the circumferentially severed core over which the lower end portion of the cylindrical shell of the body 10 has already passed.

As the device is pressed downwardly and rotated, the lower face of the platform 14 may abut and ride upon the upper end of the short core plug beneath it, from which then a shaving of full or maximum thickness will be cut by the edge 22 of the inclined revolving knife blade 13.

The spiral shaving of core is lifted by the upwardly inclined revolving knife blade 13 and is received upon the rotating platform 14, which moves beneath it until it is engaged by the upwardly inclined revolving wing 15 which then deflects this core shaving away from the platform 14, raising it upwardly in the body 10, irrespective of whether this shaving still has the form of a spiral strip, or is by this time broken into fragments.

When the annular cutting edge 17 has reached the skin or rind, this being readily perceptible, as in a grape fruit, or an orange, downward pressure upon the device is lessened, or stopped, while its rotative movement is continued until the cutting edge 22 of the revolving knife has entirely severed the lower end of the core above the rind, which is thus left intact, which is desirable for thus retaining the fruit juice within the well provided by the removed core.

When the device is lifted, it carries the removed core material, which obviously can be easily emptied from the cylindrical container 10.

It is obvious that various modifications may be made in the construction shown in the drawing and above particularly described, within the principle and scope of my invention as defined in the appended claims. However, it is to be noted that the particular device disclosed has been found in practice to function in a completely satisfactory manner.

I do not specifically limit myself as to materials, size, shape, proportions, arrangement, relationship, or inconsequential details, these being given simply as a means for clearly describing the device of my invention.

What I claim is:

1. In a coring device, in combination, a tubular cylindrical member having a smooth annular cutting edge at its lower end, an upwardly extended handle fixed to said member by means of which it may be concomitantly revolved on its axis and pushed downwardly for cutting circumferentially around a core, and a radially extended knife blade fixed within said member and having a lower cutting edge from which said blade inclines upwardly, a supporting platform spaced above said annular cutting edge and arranged to receive core material cut free from the circumferentially cut core by said blade as the latter revolves and moves downwardly, and a material-displacing wing inclined upwardly from and forming a continuation of the trailing portion of said platform.

2. In a coring device, in combination, a tubular cylindrical member having a smooth annular cutting edge at its lower end, an upwardly extended handle fixed to said member by means of which it may be concomitantly revolved on its axis and pushed downwardly for cutting circumferentially around a core, and a radially extended knife blade fixed within said member and having a lower cutting edge from which said blade inclines upwardly, a supporting platform spaced above said annular cutting edge and arranged to receive core material cut free from the circumferentially cut core by said blade as the latter revolves and moves downwardly, and a material-displacing wing inclined upwardly from and forming a continuation of the trailing portion of said platform, the cutting edge of said knife blade throughout its length being spaced upwardly from said annular cutting edge.

3. In a coring device, in combination, a tubular cylindrical member having a smooth annular cutting edge at its lower end, an upwardly extended handle fixed to said member by means of which it may be concomitantly revolved on its axis and pushed downwardly for cutting circumferentially around a core, a horizontal circumferentially incomplete platform disc fixed within said member in spaced relation above its said annular cutting edge, a knife blade bent downwardly at an obtuse angle from the leading portion of said platform and having a substantially radially extended lower cutting edge from which said blade inclines upwardly to said platform, and a material-lifting wing bent upwardly at an obtuse angle from and forming a continuation of the trailing portion of said platform.

4. In a coring device, in combination, a tubular cylindrical member having a smooth annular cutting edge at its lower end, an upwardly extended handle fixed to said member by means of which it may be concomitantly revolved on its axis and pushed downwardly for cutting circumferentially around a core, a horizontal circumferentially incomplete platform disc fixed within said member in spaced relation above its said annular cutting edge, a knife blade bent downwardly at an obtuse angle from the leading portion of said platform and having a substantially radially extended lower cutting edge from which said blade inclines upwardly to said platform, and a material-lifting wing bent upwardly at an obtuse angle from and forming a continuation of the trailing portion of said platform, the cutting edge of said knife blade throughout its length being spaced upwardly from said annular cutting edge.

5. In a coring device, in combination, a tubular cylindrical member having a smooth annular cutting edge at its lower end, an upwardly extended handle fixed to said member by means of which it may be concomitantly revolved on its axis and pushed downwardly for cutting circumferentially around a core, a horizontal circumferentially incomplete platform disc fixed within said member in spaced relation above its said annular cutting edge, a knife blade bent downwardly at an obtuse angle from the leading portion of said platform and having a substantially radially extended lower cutting edge from which said blade inclines upwardly to said platform, said platform having a circularly curved peripheral edge extending substantially through 270 degrees and fixedly secured to the cylindrical wall of said tubular member, and a quadrant-shaped material-lifting wing bent upwardly at an obtuse angle from the trailing portion of said platform disc and forming a terminal continuation of the latter.

JOHN PEKROL.